US011967193B2

(12) United States Patent
Cozza

(10) Patent No.: US 11,967,193 B2
(45) Date of Patent: Apr. 23, 2024

(54) MULTI-FACTOR SAFE LOCK

(71) Applicant: Keologic, LLC, Minnetonka, MN (US)

(72) Inventor: Joe Cozza, Eden Prairie, MN (US)

(73) Assignee: KEOLOGIC, LLC, Minnetonka, MN (US)

( * ) Notice: Subject to any disclaimer, the term of this patent is extended or adjusted under 35 U.S.C. 154(b) by 0 days.

(21) Appl. No.: 17/961,870

(22) Filed: Oct. 7, 2022

(65) Prior Publication Data

US 2023/0115152 A1 Apr. 13, 2023

Related U.S. Application Data

(60) Provisional application No. 63/253,644, filed on Oct. 8, 2021.

(51) Int. Cl.
*G07C 9/00* (2020.01)
*E05B 65/00* (2006.01)

(52) U.S. Cl.
CPC ...... *G07C 9/00912* (2013.01); *E05B 65/0075* (2013.01); *G07C 9/00563* (2013.01)

(58) Field of Classification Search
CPC .............................. G07C 9/00; G07C 2009/00
See application file for complete search history.

(56) References Cited

U.S. PATENT DOCUMENTS

| | | | | |
|---|---|---|---|---|
| 4,457,091 | A | 7/1984 | Wallerstein | |
| 6,130,621 | A * | 10/2000 | Weiss | G07C 9/00182 312/333 |
| 6,260,300 | B1 | 7/2001 | Klebes et al. | |
| 6,433,863 | B1 | 8/2002 | Weiss | |
| 6,724,919 | B1 | 4/2004 | Akiyama et al. | |
| 6,748,792 | B1 | 6/2004 | Freund et al. | |
| 6,819,248 | B2 | 11/2004 | Gotfried | |
| 6,853,739 | B2 | 2/2005 | Kyle | |
| 7,161,468 | B2 | 1/2007 | Hwang et al. | |
| 9,097,057 | B2 | 8/2015 | Pendleton et al. | |

(Continued)

FOREIGN PATENT DOCUMENTS

| | | |
|---|---|---|
| CN | 210636969 U | 5/2020 |
| ES | 2318753 | 5/2009 |

(Continued)

OTHER PUBLICATIONS

Youtube, Breathalyzer Lock Box, https://www.youtube.com/watch?v=MnetAQcloM8, accessed Oct. 7, 2022.

(Continued)

*Primary Examiner* — Daniell L Negron
(74) *Attorney, Agent, or Firm* — GRUMBLES LAW PLLC; Bryan Kravis

(57) ABSTRACT

A multi-factor safe locking system for use in firearm storage, wherein the factors comprise a user's provided key, a user's biometric data, and a user's provided code. In some embodiments, the multi-factor safe locking system requires the near-simultaneous entry of two users, or dual consent of the two users to enter at least two unique keys, at least one form of biometric data from each user, and at least two unique codes, wherein each user supplies their own unique code to access the safe's contents. In further embodiments, a safe locking system includes a further factor of a result from a blood alcohol test.

15 Claims, 7 Drawing Sheets

(56) References Cited

U.S. PATENT DOCUMENTS

| | | | | |
|---|---|---|---|---|
| 9,354,010 | B1 | 5/2016 | McCulloch | |
| 9,404,286 | B2 | 8/2016 | Stevens | |
| 9,442,466 | B2 | 9/2016 | Gilbertson et al. | |
| 10,109,124 | B2 | 10/2018 | Gilbertson et al. | |
| 10,305,895 | B2 | 5/2019 | Barry et al. | |
| 10,565,809 | B2 | 2/2020 | Gilbertson et al. | |
| 10,567,376 | B2 | 2/2020 | Azar et al. | |
| 10,655,362 | B2 | 5/2020 | Ulleberg | |
| 2004/0085187 | A1 | 5/2004 | Gotfried et al. | |
| 2005/0127172 | A1* | 6/2005 | Merkert | G07C 9/22<br>235/382 |
| 2006/0182661 | A1 | 8/2006 | Aquila | |
| 2006/0253711 | A1 | 11/2006 | Kallmann | |
| 2007/0085655 | A1 | 4/2007 | Wildman et al. | |
| 2007/0186106 | A1 | 8/2007 | Ting et al. | |
| 2009/0027161 | A1 | 1/2009 | Kent | |
| 2010/0012417 | A1 | 1/2010 | Walter et al. | |
| 2011/0252839 | A1 | 10/2011 | Stevens | |
| 2013/0066223 | A1 | 3/2013 | Beck et al. | |
| 2013/0229098 | A1 | 9/2013 | Pletcher | |
| 2017/0279795 | A1* | 9/2017 | Redberg | H04L 63/0861 |

FOREIGN PATENT DOCUMENTS

| | | | | |
|---|---|---|---|---|
| GB | 2392201 A | | 2/2004 | |
| KR | 2011-0121425 A | * | 11/2011 | E05B 65/0075 |
| KR | 101615472 B1 | | 4/2016 | |
| TW | 201740003 A | | 11/2017 | |

OTHER PUBLICATIONS

Amazon, awesafe, Gun Safe with Fingerprint Identification and Biometric Lock, https://www.amazon.com/awesafe-Gun-Safe/dp/B07TM45FRS/, accessed Oct. 7, 2022.

* cited by examiner

MULTI-FACTOR SAFE LOCK

FIELD

This disclosure relates to safe locking systems, particularly for such safe locking systems that require multiple inputs by one or more individuals to deactivate the locking system. Such input factors may include at least one biometric component, a key, and a code. Additionally, these factors may be combined with a timing element.

BACKGROUND

Even with the enumerable variety of safe locking systems available in the marketplace, there is still an existing unmet need for firearm storage, especially when dealing with unauthorized access and misuse of weapons. Exceptionally deadly weapons, such as guns, demand the highest level of respect and sound judgment before they are put into use. Storing or providing access to such weapons can require a tremendous amount of responsibility, inherently from the gun owner. As is well known, alcohol can impair a person's judgment, and handling a weapon while under the influence of alcohol is when deadly mistakes can occur. Additionally, a spouse, family member, roommate, or other individuals may be uncomfortable living and sleeping in a dwelling where a gun is present. For instance, a heated argument with a person who has unbridled access to a deadly weapon in the home may create a point of contention for the gun user and the other individuals residing in the home.

Furthermore, suicide prevention is another situation where access to a firearm should be restricted. For instance, vulnerable teenagers navigating adolescence can spend hours home alone after school unsupervised, or a spouse concerned about their partner's mental health. Of all suicide attempts not involving guns, 94% fail, and most of those people do not try again. Of all suicide attempts that do involve guns, 90% succeed.

Existing safes tend to list multiple points of access as a benefit. These can include any or all of the following: a key, a keypad, a fingerprint scanner, an RFID chip, a remote Bluetooth button, a mobile phone application transmitting Bluetooth or WIFI, or a mechanical lock. It is unclear why some safes on the market have been engineered with as many as five access points for a user to gain access therein. Every access point to a safe is a point of weakness because only one access point needs to be breached to gain entry therein. Additionally, with mobile phone applications, users may now have the ability to unlock their safe via WIFI from anywhere in the world; this allows a user to open a safe containing a weapon when not standing directly in front of it.

Safe manufacturers list the amount of time it takes to access the contents within their safe, where faster speeds are perceived as being better. This is typically associated with the middle-of-the-night burglary scenario where a user wishes to access their firearm as quickly as possible. In many safes with biometric entry points, users can open the safe and access their weapon in less than one second. However, waking up from a deep sleep and having access to a firearm in one second while your body pumps adrenaline into your blood offers an opportunity for deadly mistakes to occur. A more comprehensive prevention system is needed to ensure users cannot so easily access firearms.

SUMMARY

According to this disclosure, a multi-factor locking system for a safe is described along with an explanation of the specific order of operation needed for a user, or multiple users, to access the safe by satisfying the requirements of each factor. Each user is required to present something they have (i.e., insert and turn a physical key, swipe a card, tap an RFID chip, etc.), provide something they are (i.e., fingerprint, facial recognition, scan iris, etc.), and enter something they know (i.e., enter a passcode, answer a personal question, recognize a pattern, etc.). All of these steps may need to be completed in a predetermined set of steps in order for the safe lock to open.

In one embodiment of the present disclosure, a safe locking system may include a multi-factor safe lock having at least two keyed-locks that respond to unique keys. This embodiment may also include at least one biometric reader that may respond to biometric data from at least two users. The embodiment may also include a code pad which may respond to at least two unique codes. In some embodiments, the at least two keys may comprise electronically-transmittable keys, or physical keys.

Such an embodiment may be structured and configured to deactivate the safe lock when within a first predetermined time, the least two unique keys may engage the at least two keyed-locks, the at least one biometric reader responds to the biometric input from at least two users, and an entry of at least two unique codes into the code-pad. This biometric reader of this embodiment may comprise either a fingerprint scanner, or an iris scanner. In such an embodiment, the first predetermined time may range from ninety seconds to five minutes.

An additional variation of the first embodiment may include a second biometric reader. In such a variation, the safe lock may be structured and configured to deactivate when, within a first predetermined time, the at least two unique keys may be engaged with the at least two keyed-locks, the first biometric reader may then respond to a first biometric input from the at least two users, the second biometric reader may respond to a second biometric input from the at least two users, and an entry of the at least two unique codes into the code-pad.

Further variations of this embodiment may include a blood-alcohol sensor as the second biometric reader, wherein the blood-alcohol sensor may respond to a predetermined amount of blood alcohol. In such an embodiment, the first biometric reader may comprise a fingerprint scanner, or an iris scanner.

A method of using a multi-factor safe locking system may comprise the following steps where the first step may be providing a multi-factor safe locking system for a safe that may have at least two keyed-locks, wherein each keyed-lock may require a unique key; at least one biometric reader, wherein the at least one biometric reader may be structured and configured to respond to a biometric input from at least two users; a code pad, wherein the code pad may be structured and configured to respond to at least two unique codes; and a safe lock, wherein the safe lock may be structured and configured to deactivate within a first predetermined time.

After which, the next step may be applying a first key by a first user to a first keyed-lock. That may be followed by the engaging of the first key with the first keyed-lock; wherein the engaging of the first key may activate the at least one biometric reader. Then the inputting of a first biometric from the first user into the at least one biometric reader may occur, wherein the at least one biometric reader can respond by activating the code pad. After which, the inputting of a first code into the code pad may take place, which may then be followed by applying a second key by a second user to a second keyed-lock. Following that, the engaging of the second key with the second keyed-lock may occur, wherein the engaging of the second key can activate the at least one biometric reader. After which, the inputting of a second biometric from the second user into a first biometric reader can occur, wherein the first biometric reader may respond by activating the code pad. Then the inputting of a second code into the code pad may occur before the end of the passing of the first predetermined time. After which, the deactivating of the safe lock may ensue. In such a method, the at least one biometric reader may be a fingerprint scanner, or an iris scanner. Additionally, the first predetermined time may comprise a range from ninety seconds to five minutes. In this method, the at least two keys may be electronically-transmittable keys, or physical keys.

Other variations of the method may include the additional steps of inputting a second biometric of the first user into a second biometric reader, and inputting a second biometric of the second user into the second biometric reader. With these additional steps, the second biometric reader may be a blood-alcohol sensor.

Another method of using a multi-factor safe locking system can comprise the following steps. Where the first step can be the providing of a multi-factor safe locking system for a safe comprising a first keyed-lock, wherein the first keyed-lock may require a unique key; a first biometric reader, wherein the first biometric reader may be structured and configured to respond to a first biometric input from a first user; a second biometric reader, wherein the second biometric reader may be structured and configured to respond to a second biometric input from a first user; a code pad; and a safe lock. Following that, the applying of the unique key by the first user to the first keyed-lock may occur. After which, the engaging of the first key with the first keyed-lock may ensue, wherein the engaging of the first key can activate the first biometric reader. After which, the inputting of the first biometric from the first user into the first biometric reader may occur, wherein the first biometric reader can respond by activating the code pad. Following that, the inputting of a first code into the code pad may occur, wherein the code pad can activate the second biometric reader. Following that, the inputting of the second biometric from the first user into the second biometric reader may ensue. After which the deactivating of the safe lock may occur.

Variations of this method may include the addition of the safe lock that can be structured and configured to deactivate within a first predetermined time, wherein the first predetermined time may comprise a range from ninety seconds to five minutes. Additional variations of this method may include the first biometric reader as a fingerprint scanner, or an iris scanner. Other forms of this method may include a second biometric reader as a blood-alcohol sensor.

BRIEF DESCRIPTION OF THE DRAWINGS

The following description should be read with reference to the drawings. The drawings, which are not necessarily to scale, depict examples and are not intended to limit the scope of the disclosure. The disclosure may be more completely understood in consideration of the following description with respect to various examples in connection with the accompanying drawings.

DETAILED DESCRIPTION

Figure 1:
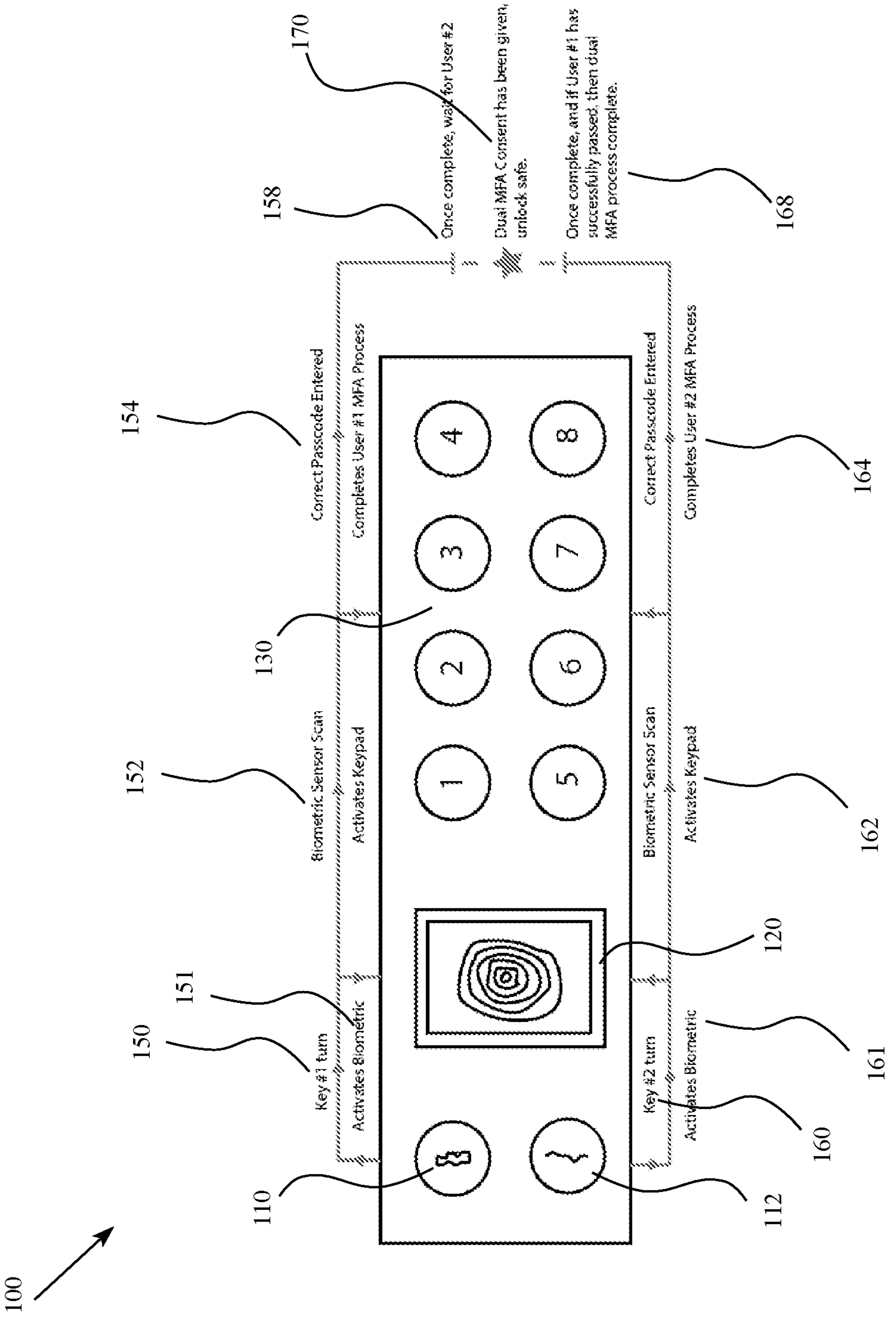
FIG. 1 is a flow diagram illustrating the use of an embodiment of a dual-consent/multi-factor safe lock of the present disclosure.

The present disclosure relates to safe locking systems, particularly to such safe locking systems that include a biometric input component, a key, and a code. Various embodiments are described in detail with reference to the drawings, in which reference numerals may be used to represent parts and assemblies throughout the several views. Reference to various embodiments does not limit the scope of the systems and methods disclosed herein. Examples of construction, dimensions, and materials may be illustrated for the various elements; those skilled in the art will recognize that many of the examples provided have suitable alternatives that may be utilized. Any examples set forth in this specification are not intended to be limiting and merely set forth some of the many possible embodiments for the systems and methods. It is understood that various omissions and substitutions of equivalents are contemplated as circumstances may suggest or render expedient. Still, these are intended to cover applications or embodiments without departing from the disclosure's spirit or scope. Also, it is to be understood that the phraseology and terminology used herein are for the purpose of description and should not be regarded as limiting.

The multi-factor process can contain at least three factors, including 1) Something you have, 2) Something you are, 3) Something you know; e.g., 1) a user with a key, 2) a user's fingerprint, and 3) a code that the user has committed to memory. The technology available to complete each of these MFA requirements may evolve over time. Still, the underlying process of using the concept of MFA to positively identify two specific individuals to establish dual consent remains the same. For instance, the fingerprint sensor could be replaced or supplemented by a facial recognition sensor, or the key could be replaced with a Bluetooth transmittable code. These technologies both use biometric data and serve to satisfy the requirement of providing something you are.

Dual Consent Embodiments

Safes that require two keys to open fall generally into the depository-safe category. For example, one key is for a banker/guard, and the other key is for the renter of the safe. Only when both the banker/guard key and renter key are turned independently will the safe open. The bank will likely verify the renter's identity; this can be done via some form of photo identification in combination with a bank account number. Once their identity has been validated, the renter may then be allowed to insert their key into the safe. The banker/guard's identity is managed and verified by the bank; as an employee, they are given the authorization to hold and protect the bank key required to access one safe for one renter or many safes for many renters. It must be noted that the safe itself only requires two keys to access the safe and does not require multi-factor authentication from each individual. A depository safe without the bank guard is merely a box that requires two keys to open; there is no concern about who may be inserting the key and opening the safe. Bank safes may sometimes include two mechanical locks or two digital locks, whereby two passcodes are required to gain access. However, in either case, no biometric authentication is required to verify who may be entering each code.

The bank is providing a service to the renter by verifying their identity via a photo identification check and requiring the individual to present their key, i.e., the second key, to open the safe. The renter pays a fee to have this service and assumes the banker is who they say they are (the company verifies the employee identity and provides company identification such as a badge) and will present a first key to open the safe. This type of commercial transaction, whereby one user holds the responsibility and duty of protector of the safe, would be unfeasible for the in-home safe market.

Outside of this commercial entity and individual renter relationship, there are many safes, boxes, lockers, and cabinets that require two keys to open. However, none of these devices are concerned with who each person is (individual biometric identification) or what they know (passcodes defined by each individual user). Such existing safe-locking systems are only concerned that two correct keys (physical or biometrical) are entered to grant access to the safe. Additionally, all two-key safes identified thus far require different keys for entry but have identical lock types, meaning that if one lock was compromised or picked, the second lock could be compromised or picked with the same tools and know-how.

There are devices on the market today that incorporate biometric authentication into their products. These devices include phones, computers, door locks, airport security kiosks, and safes. Biometric authentication today typically comes in the form of a fingerprint sensor, facial recognition sensor, or iris scanner. These technologies are expected to evolve and expand over time.

In the gun-safe market, anecdotally, the fingerprint sensor appears to be a dominant method being utilized as a biometric lock for such safes. There are at least three main types of fingerprint sensors being used in the consumer market: (1) optical, (2) capacitive, and (3) ultrasonic. The most common, most affordable, and potentially least secure and reliable is the optical sensor. The capacitive sensor, is the next most common and appears to offer more reliability and security than the optical sensor. Finally, the ultrasonic sensor is one of the newer technologies to reach the market, and although some phones are adopting the technology, due to manufacturing and packaging advantages, the ultrasonic fingerprint scan process seems slow, and its relative reliability and security are unclear. Such biometric sensors can be adapted into a biometric safe lock.

The gun-safe market was initially dominated by the optical sensor, and due to its unreliability, users began to avoid using this sensor as the main access method. Over time, the capacitive sensor has entered the market and is on many new safe products. However, the stigma of poor reliability has persisted. Many users do not trust the fingerprint sensor technology in their safes, even though they may employ the same technology every day on their phones. For users who trust their fingerprint sensor, this access method is praised for the user's ability to gain quick access to the safe. Additionally, some safes on the market have incorporated a static capacitive sensor into their product offerings; however, in most cases, it appears the biometric sensor is optional equipment and must be specifically selected upon purchase.

Other safes known in the market have installed a multi-directional swipe-style capacitive fingerprint sensor as opposed to a static sensor. The swipe-style sensor may be slightly less reliable but potentially faster to scan and open the safe. A few companies deliver their products with biometric scanners installed as standard/required equipment intended as the main source of entry into the safe. In all cases, however, the user can access the safe with a backup key and bypass the biometric authentication altogether. There appears to be no gun safe on the market that requires two different fingerprints from two different individuals before access to the items stored therein can be granted. Some safes may allow users to manually set up two-factor authorization (2FA) as an option for one individual but still provide a backup key to bypass this 2FA method.

An important note for many biometric sensors and electronic keypads is that they provide the ability for multiple "users" to access the safe. For instance, some safes allow users to set up multiple codes whereby any one of the codes could enter the safe if entered individually. Similarly, some biometric sensors store up to one hundred twenty different fingerprints in the safe, whereby any one of these fingerprints could open the safe. This is clearly not meant to limit the number of people who are authorized to enter the safe but rather to enable multiple people to open the safe using their own data or passcode.

Regarding FIG. 1, a flow diagram is illustrated about the dual-consent multi-factor locking mechanism 100. The first action 150 is the engaging of a first key (not shown) by a first user with a first keyed-lock 110. Keys that may be used in the keyed-lock can be a physical key or an electronically-transmittable key, i.e., a key coded into a smart device or RFID chip. The first user may then engage the first key with the first keyed-lock 110, which may then activate 151 the fingerprint scanner 120, which may then allow the first user to proceed to a second action 152 wherein the first user can present a fingerprint to the fingerprint scanner 120. The fingerprint scanner 120 may include an electronic storage device (not shown) that may be pre-configured to contain the fingerprint images of at least a first user and a second user. If the fingerprint scanner 120 positively recognizes the first user's fingerprint, then the first user may take a third action 154 and enter a unique passcode into the keypad 130; the code can only be known to the first user. Once the first 150, second 152, and third 154 actions have been successfully completed by the first user, a second user may begin the fourth action 160 with the engaging of a second key (not shown) by a second user into a second keyed-lock 112. The first keyed-lock 110 and the second keyed-lock 112 may be structured and configured to receive unique keys, wherein the first keyed-lock 110 is capable of receiving a first key which in turn cannot then be received by the second keyed-lock 112. The Second user may then engage the second key in the second keyed-lock 112, which may then activate 161 the fingerprint scanner 120, which may then allow the second user to proceed to a fourth action 162 wherein the second user can present a second fingerprint, wherein the second fingerprint is unique to the second user, to the fingerprint scanner 120. If the fingerprint scanner 120 positively recognizes the second user's fingerprint, then the second user may take a sixth action 164 and enter a passcode into the keypad 130 that is unique, and only known to the second user. Once the fourth 160, fifth 162, and sixth 164 actions have been successfully completed by the second user, then the seventh action 170 may occur as the dual-consent has been completed, and the dual-consent multi-factor locking mechanism 100 may then disengage, allowing access to items stored within the safe, i.e., a firearm.

Each user may be allowed up to 90 seconds to complete all of their actions. If a code provided by either the first or second user is incorrect, then the user who entered the incorrect code may be allowed at least two additional attempts. In some instances, after three consecutive incorrect code entries, by any user, the safe may be configured to lock out all users for a set period of time. Such a period of time can range from a few minutes, for example, 10 minutes, or it may remain in a lock-out mode for several hours. In such an occurrence, a user may need to start the process from the beginning and remove and re-engage their keys after this lock-out period and proceed with actions one through seven.

Other scenarios where the safe may not allow access can include instances where a key, either the first or second, does not engage, and then the biometric sensor 120 may not activate, and access may not be granted. There may be no set lock-out period, as a user may need to engage the correct key to activate the biometric sensor 120 for action two 152, or action six 162.

If the biometric data provided to the biometric sensor 120 is not correct/validated, then the keypad 130 may not activate, and access to the keypad 130 may not be granted. If a correct code is not entered during the proscribed time period or the number of code tries has been exceeded, then the process may need to be restarted. In some embodiments, where three consecutive lock-outs may have occurred within 30 minutes, whether from a timeout or incorrect code entry, in aggregate of both users, the safe may not allow another attempt for up to 30 minutes, and the users may need to remove and re-engage their keys to start again after this lock-out period.

Figure 2A:
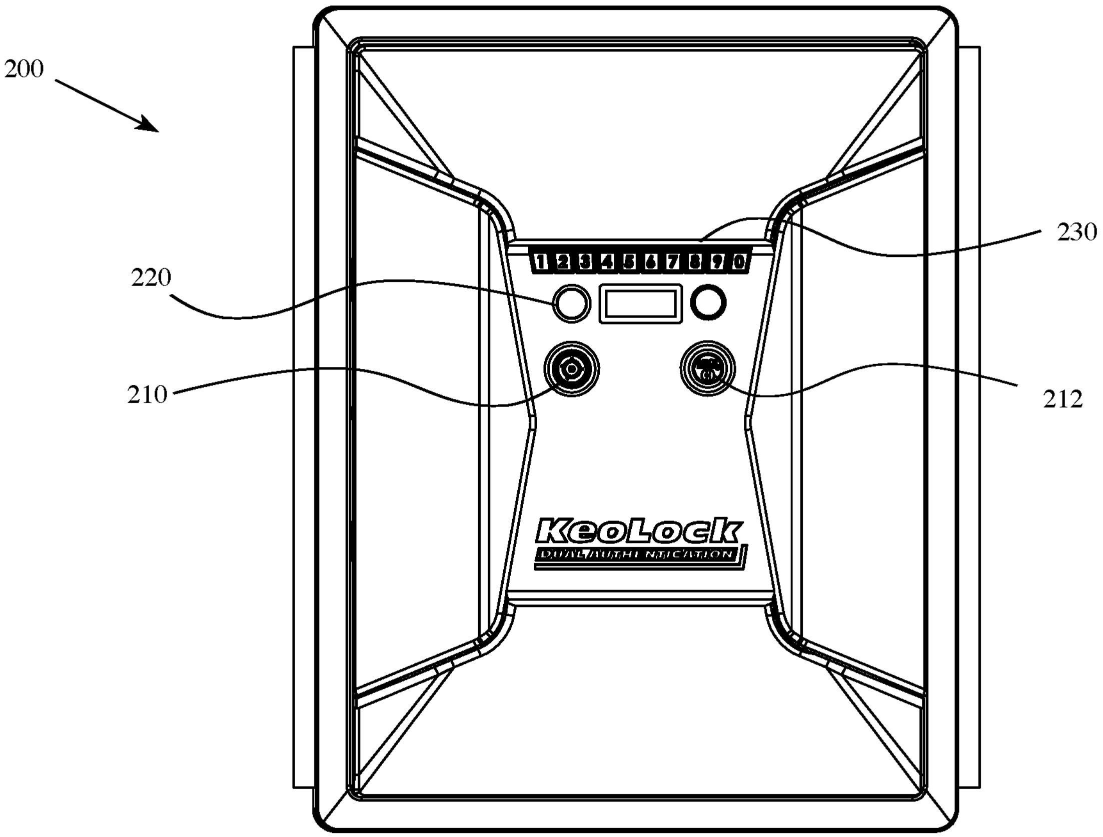
FIG. 2A is a front view of an embodiment of a dual-consent multi-factor safe lock of the present disclosure.
Figure 2B:
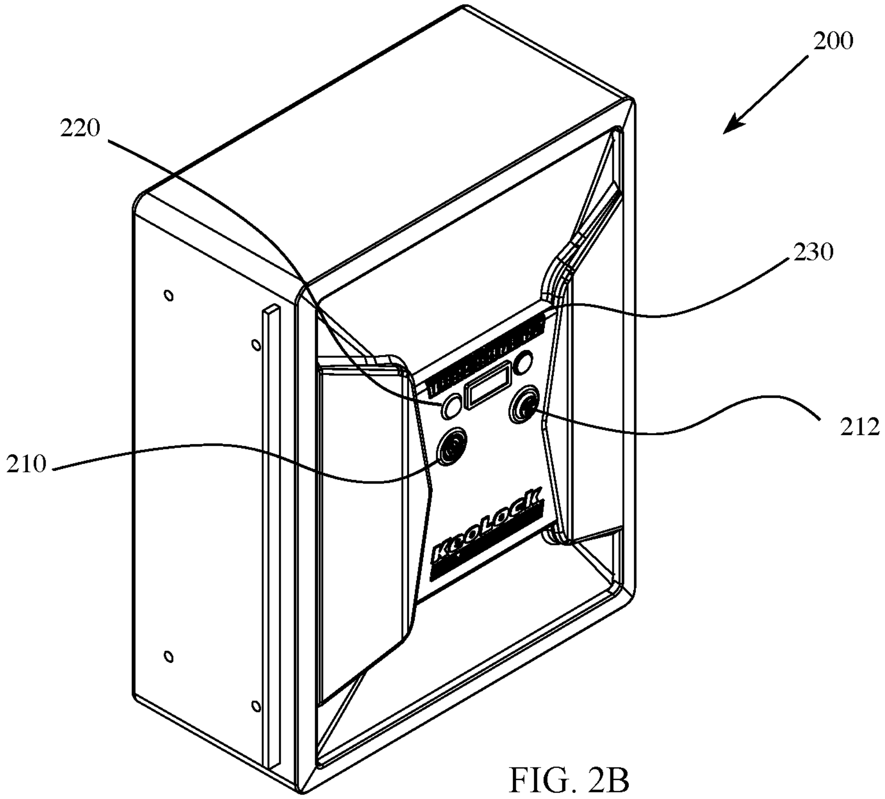
FIG. 2B is a perspective view of an embodiment of a dual-consent multi-factor safe lock of the present disclosure.

Regarding FIGS. 2A-2B, where two views of an embedment of a dual-consent multi-factor locking system 200 are illustrated. In this embodiment, the first keyed-lock 210 and the second keyed-lock 212 may each require a unique physical key; however, it is contemplated that the two keyed-locks for a dual-consent multi-factor locking system 200 can be transmitted from such devices as a user's smartphone (smart device) or an RFID chip possessed by the user. The first biometric sensor 220 may be a fingerprint reader, an iris scanner, or any other externally presentable biometric input that a person of ordinary skill in the art can devise. The code pad 230 may include entry buttons one through eight; however, such a code pad may include any standard number of symbols for such pads; there is no limitation on the variety of markings that are provided on such a pad.

In some other embodiments, a predetermined time for each user may be allowed where the users may have up to ninety seconds to complete all three actions beginning once either the first or second key is engaged. If a user fails to complete their actions within the predetermined amount of time, then both users may need to restart the entire process from the beginning and re-engage their key. If users fail in three consecutive attempts due to timeouts, the safe may not allow another attempt from either user for 5 minutes, or another amount of time deemed appropriate, and then they can re-engage their key to start again. The lock-out time may be considerably longer if a user desires; such an option may be programmable with the multi-factor safe-locking system. For instance, an inebriated user may need a significant amount of time to pass to ensure their sobriety prior to accessing a firearm.

Breath Alcohol Test ("Bat") Embodiment

No one should handle a deadly weapon while under the influence of alcohol. Deadly weapons, such as guns, demand the highest level of respect and sound judgment. Storing or providing access to weapons requires a tremendous amount of responsibility inherently from the gun owner. Alcohol impairs judgment, and handling a weapon while under the influence of alcohol is when deadly mistakes could occur.

A blood-alcohol sensor may be provided on a gun-safe locking device which may require an individual user to pass a breath alcohol test as part of the unlocking process. This lock may include a multi-factor authentication (MFA) locking mechanism, and the BAT would be an additional authorization step to ensure an individual is not under the influence of alcohol. The individual may provide a breath sample via a breath tube inserted into the receptacle on the BAT gun safe lock, and the device may provide a pass/fail result to the lock as part of the authorization process.

Figure 3:
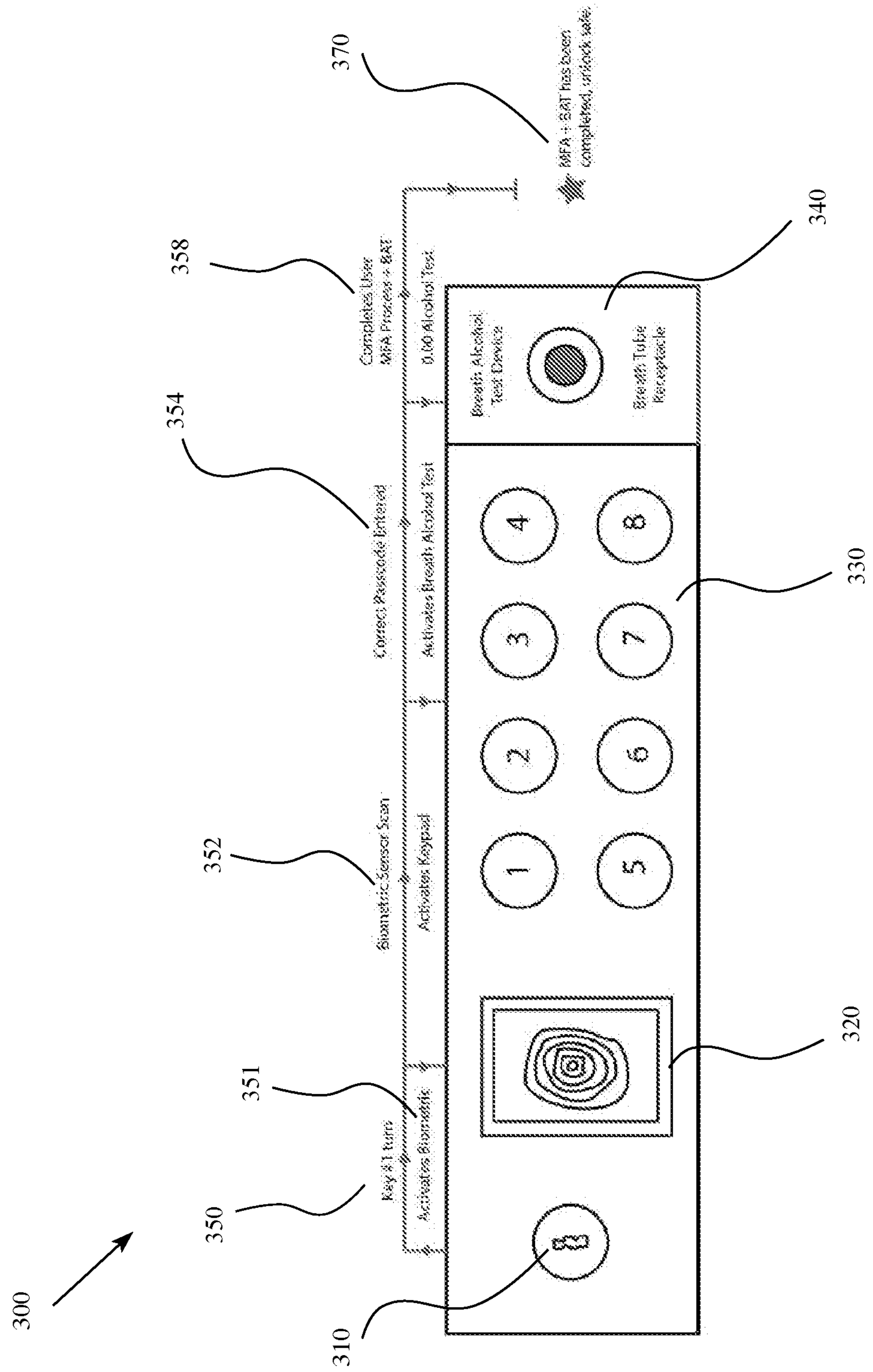
FIG. 3 is a flow diagram illustrating the use of an embodiment of a multi-factor safe lock with a blood-alcohol sensor of the present disclosure.

Regarding FIG. 3, a flow diagram is illustrated about the multi-factor locking mechanism 300. The first action 350 is the engaging of a first key (not shown) by a first user with a first keyed-lock 310. Keys that may be used in the keyed-lock can be a physical key or an electronically-transmittable key, i.e., a key coded into a smart device or RFID chip. The first user may then engage the first key with the first keyed-lock 310, which may then activate 351 the fingerprint scanner 320, which may then allow the first user to proceed to a second action 352 wherein the first user can present a fingerprint to the fingerprint scanner 320. The fingerprint scanner 320 may include an electronic storage device (not shown) that may be pre-configured to contain the fingerprint images of at least a first user and a second user. If the fingerprint scanner 320 positively recognizes the first user's fingerprint, then the first user may take a third action 354 and enter a unique passcode into the keypad 330; the code can only be known to the first user. Once the unique passcode has been entered, the fourth action 358 may occur where the first user may exhale into the second biometric device 340, as illustrated in FIG. 3 as a blood-alcohol sensor. Such a sensor may require the user to insert a disposable tube therein for the user to exhale into the sensor.

Once the first 350, second 352, third 354, and fourth 358 actions have been successfully completed by the first user, then the seventh action 370 may occur, as all the multi-factors have been properly completed, and the multi-factor locking mechanism 300 may then disengage allowing access to items stored within the safe, i.e., a firearm.

The first user may be allowed up to 90 seconds to complete all of their actions. If a code provided by the first is incorrect, then the first user may be allowed at least two additional attempts. In some instances, after three consecutive incorrect code entries, the safe may be configured to lock out the first user for a set period of time. Such a period of time can range from a few minutes, for example, 10 minutes, or it may remain in a lock-out mode for several hours. In such an occurrence, a user may need to start the process from the beginning and remove and re-engage their key after this lock-out period and proceed with actions one through seven.

Other scenarios where the safe may not allow access can include instances where the key does not engage, and then the biometric sensor 320 may not activate, and access may not be granted. There may be no set lock-out period, as a user may need to engage the correct key to activate the biometric sensor 320 for action two 352.

If the biometric data provided to the biometric sensor 320 is not correct/validated, then the keypad 330 may not activate, and access to the keypad 330 may not be granted. If a correct code is not entered during the proscribed time period or the number of code tries has been exceeded, then the process may need to be restarted. In some embodiments, where three consecutive lock-outs may have occurred within 30 minutes, whether from a timeout or incorrect code entry, the safe may not allow another attempt for up to 30 minutes, and the user may need to remove and re-engage their key to start again after this lock-out period.

Figure 4A:
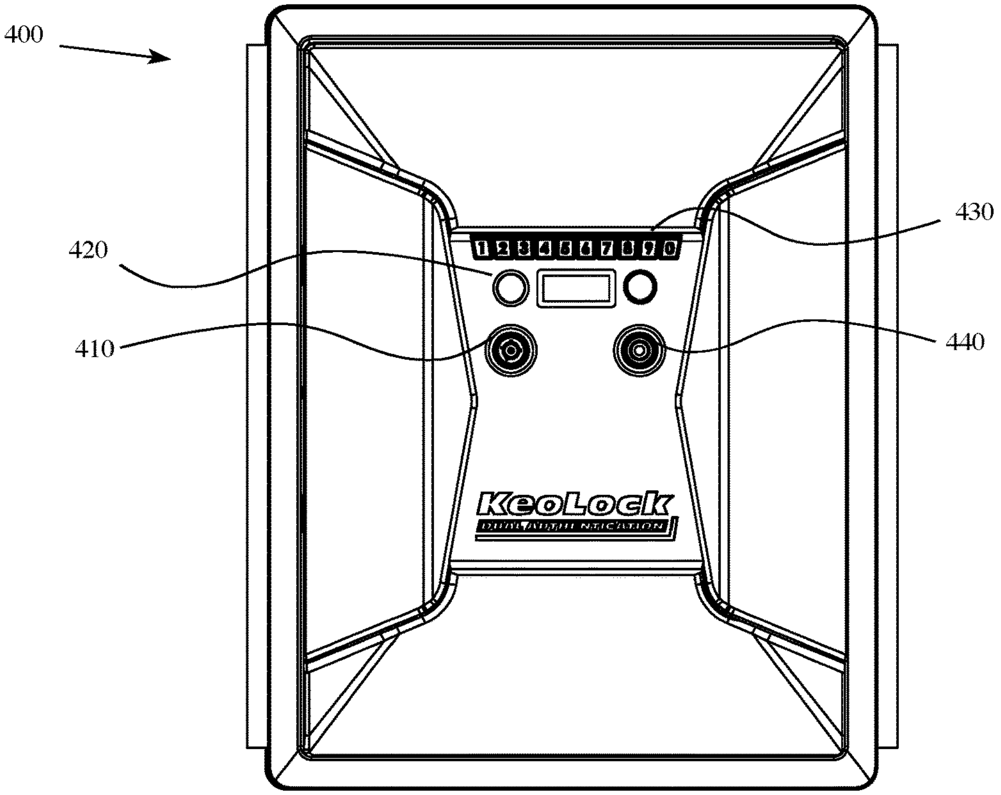
FIG. 4A is a front view of an embodiment of a multi-factor safe lock with a blood-alcohol sensor of the present disclosure.
Figure 4B:
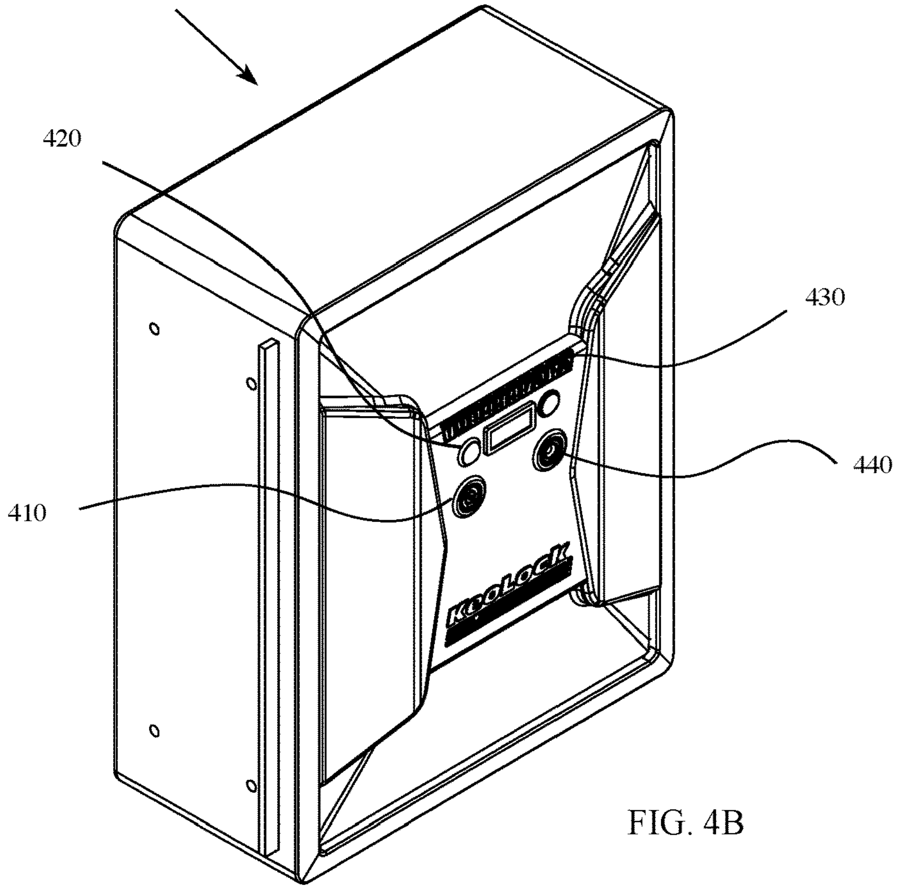
FIG. 4B is a perspective view of an embodiment of a multi-factor safe lock with a blood-alcohol sensor of the present disclosure.

Regarding FIGS. 4A-4B, where two views of an embodiment of a multi-factor locking system 400 are illustrated. In this embodiment, the first keyed-lock 410 may each require a unique physical key; however, it is contemplated that the keyed-lock 410 for the multi-factor locking system 400 can be transmitted from such devices as a user's smartphone (smart device) or an RFID chip possessed by the user. The first biometric sensor 420 may be a fingerprint reader, an iris scanner, or any other externally presentable biometric input that a person of ordinary skill in the art can devise. The code pad 430 may include entry buttons one through eight; however, such a code pad may include any standard number of symbols for such pads; there is no limitation on the variety of markings that are provided on such a pad. The second biometric device 440 may be a blood-alcohol sensor. Such a sensor may require the user to insert a disposable tube therein for the user to exhale into the sensor.

In some other embodiments, a predetermined time for the first user may be allowed where the user may have up to ninety seconds to complete all three actions beginning once the first key is engaged. If the first user fails to complete their actions within the predetermined amount of time, then the user may need to restart the entire process from the beginning and re-engage their key. If the first user fails in three consecutive attempts due to timeouts, the safe may not allow another attempt from the first user for 5 minutes, or another amount of time deemed appropriate, and then they can re-engage their key to start again. The lock-out time may be considerably longer if a user desires; such an option may be programmable with the multi-factor safe-locking system. For instance, an inebriated user may need a significant amount of time to pass to ensure their sobriety prior to accessing a firearm.

Breath Alcohol Test ("Bat") and Dual Consent Combination Embodiment

The breath alcohol testing process could be added as an additional step in the Dual Consent Gun Safe lock, or it could act as a unique product offering should various lock manufacturers wish to install a similar breath alcohol testing process to their locking mechanism.

Figure 5:
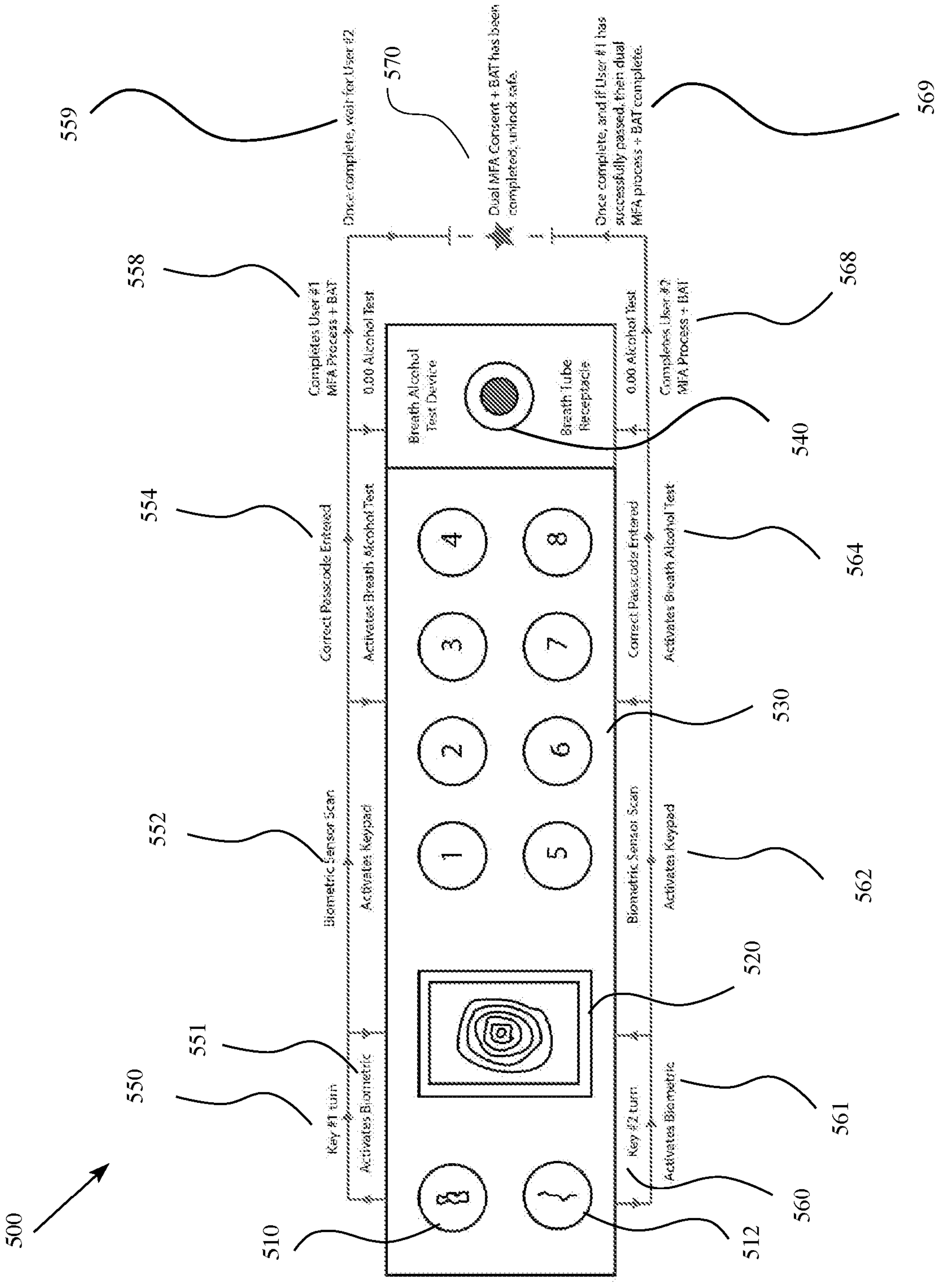
FIG. 5 is a flow diagram illustrating the use of an embodiment of a dual-consent/multi-factor safe lock with a blood-alcohol sensor of the present disclosure.

Regarding FIG. 5, a flow diagram is illustrated about the dual-consent multi-factor locking mechanism 500. The first action 550 is the engaging of a first key (not shown) by a first user with a first keyed-lock 510. Keys that may be used in the keyed-lock can be a physical key or an electronically-transmittable key, i.e., a key coded into a smart device or RFID chip. The first user may then engage the first key with the first keyed-lock 510, which may then activate 551 the fingerprint scanner 520, which may then allow the first user to proceed to a second action 552, wherein the first user can present a fingerprint to the fingerprint scanner 520. The fingerprint scanner 520 may include an electronic storage device (not shown) that may be pre-configured to contain the fingerprint images of at least a first user and a second user. If the fingerprint scanner 520 positively recognizes the first user's fingerprint, then the first user may take a third action 554 and enter a unique passcode into the keypad 530; the code can only be known to the first user. Once the unique passcode has been entered, the fourth action 558 may occur where the first user may exhale into the second biometric device 540, as illustrated in FIG. 5 as a blood-alcohol sensor. Such a sensor may require the user to insert a disposable tube therein for the user to exhale into the sensor.

Once the first 550, second 552, third 554, and fourth 558 actions have been successfully completed by the first user, a second user may begin the fifth action 560 with the engaging of a second key (not shown) by a second user into a second keyed-lock 512. The first keyed-lock 510 and the second keyed-lock 512 may be structured and configured to receive unique keys, wherein the first keyed-lock 510 is capable of receiving a first key which in turn cannot then be received by the second keyed-lock 512. The Second user may then engage the second key in the second keyed-lock 512, which may then activate 561 the fingerprint scanner 520, which may then allow the second user to proceed to a fifth action 562, wherein the second user can present a second fingerprint, wherein the second fingerprint is unique to the second user, to the fingerprint scanner 520. If the fingerprint scanner 520 positively recognizes the second user's fingerprint, then the second user may take a seventh action 564 and enter a passcode into the keypad 530 that is unique, and only known to the second user. Once the unique passcode has been entered, the eighth action 568 may occur where the second user may exhale into the second biometric device 540, as illustrated in FIG. 5 as a blood-alcohol sensor. Such a sensor may require the user to insert a disposable tube therein for the user to exhale into the sensor.

Once the fifth 560, sixth 562, seventh 564, and eighth 568 actions have been successfully completed by the second user, then the ninth action 570 may occur as the dual-consent has been completed, and the dual-consent multi-factor locking mechanism 500 may then disengage, allowing access to items stored within a safe, i.e., a firearm.

Each user may be allowed up to 90 seconds to complete all of their actions. If a code provided by either the first or second user is incorrect, then the user who entered the incorrect code may be allowed at least two additional attempts. In some instances, after three consecutive incorrect code entries, by any user, the safe may be configured to lock out all users for a set period of time. Such a period of time can range from a few minutes, for example, 10 minutes, or it may remain in a lock-out mode for several hours. In such an occurrence, a user may need to start the process from the beginning and remove and re-engage their keys after this lock-out period and proceed with actions one through eight.

Other scenarios where the safe may not allow access can include instances where a key, either the first or second, does not engage, and then the biometric sensor 520 may not activate, and access may not be granted. There may be no set lock-out period, as a user may need to engage the correct key to activate the biometric sensor 520 for action two 552, or action six 562.

If the biometric data provided to the biometric sensor 520 is not correct/validated, then the keypad 530 may not activate, and access to the keypad 530 may not be granted. If a correct code is not entered during the proscribed time period, or the number of code tries has been exceeded, then the process may need to be restarted. In some embodiments, where three consecutive lock-outs may have occurred within 30 minutes, whether from a timeout or incorrect code entry, in aggregate of both users, the safe may not allow another attempt for up to 30 minutes, and the users may need to remove and re-engage their keys to start again after this lock-out period.

Figure 6A:
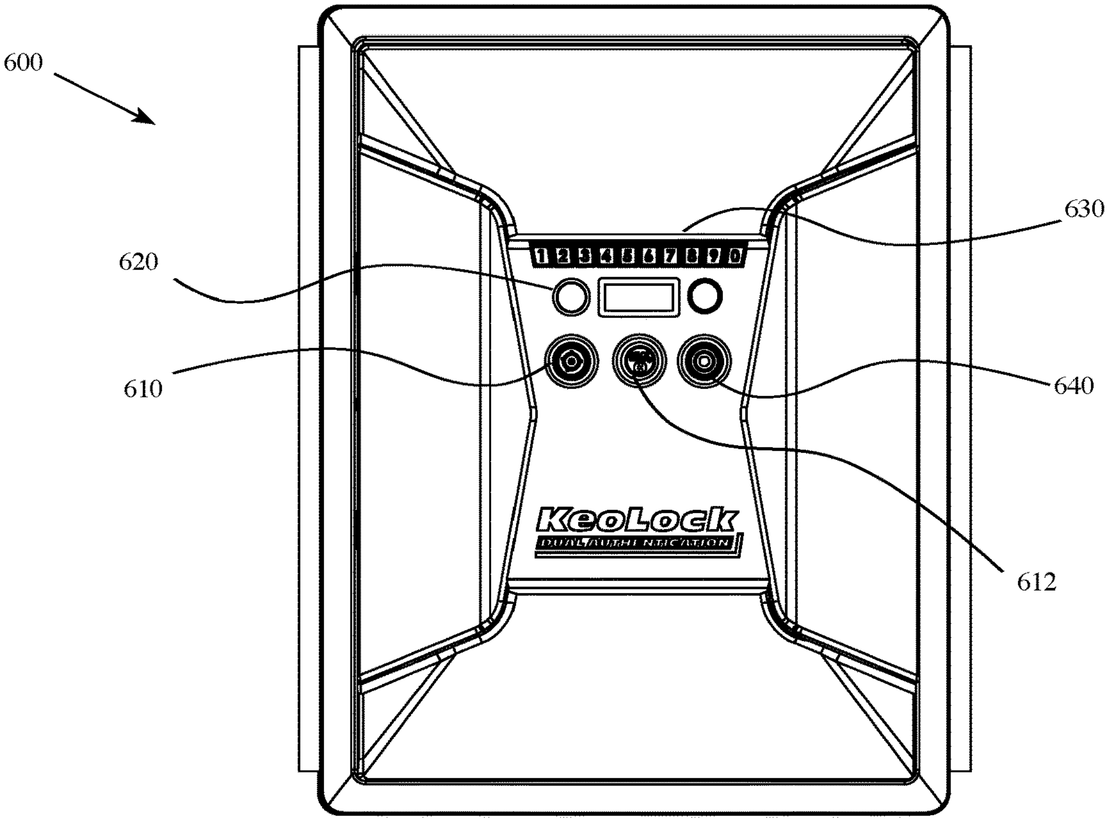
FIG. 6A is a front view of an embodiment of a dual-consent/multi-factor safe lock with a blood-alcohol sensor of the present disclosure.
Figure 6B:
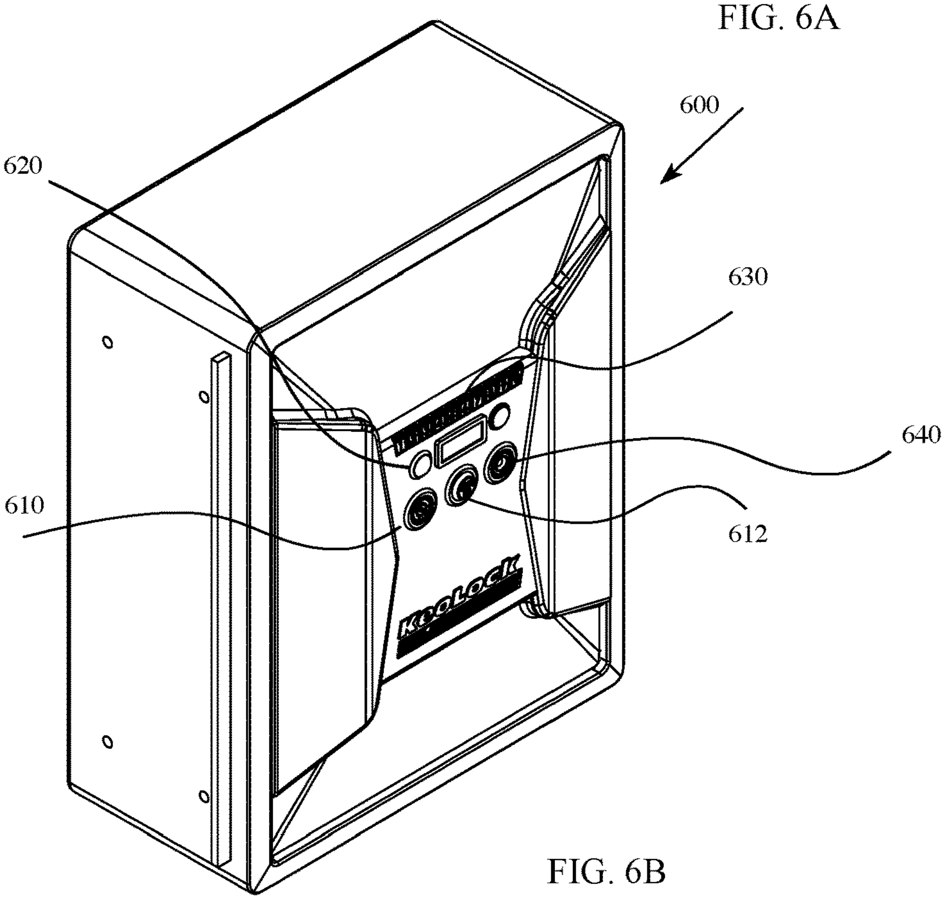
FIG. 6B is a perspective view of an embodiment of a dual-consent/multi-factor safe lock with a blood-alcohol sensor of the present disclosure.

Regarding FIGS. 6A-6B, where two views of an embedment of a dual-consent multi-factor locking system 600 are illustrated. In this embodiment, the first keyed-lock 610 and the second keyed-lock 612 may each require a unique physical key; however, it is contemplated that the two keyed-locks for a dual-consent multi-factor locking system 600 can be transmitted from such devices as a user's smartphone (smart device) or an RFID chip possessed by the user. The first biometric sensor 620 may be a fingerprint reader, an iris scanner, or any other externally presentable biometric input that a person of ordinary skill in the art can devise. The code pad 630 may include entry buttons one through eight; however, such a code pad may include any standard number of symbols for such pads; there is no limitation on the variety of markings that are provided on such a pad. The second biometric device 640 may be a blood-alcohol sensor. Such a sensor may require the user to insert a disposable tube therein for the user to exhale into the sensor.

In some other embodiments, a predetermined time for each user may be allowed where the users may have up to ninety seconds to complete all three actions beginning once either the first or second key is engaged. If a user fails to complete their actions within the predetermined amount of time, then both users may need to restart the entire process from the beginning and re-engage their key. If users fail in three consecutive attempts due to timeouts, the safe may not allow another attempt from either user for 5 minutes, or another amount of time deemed appropriate, and then they can re-engage their key to start again. The lock-out time may be considerably longer if a user desires; such an option may be programmable with the multi-factor safe-locking system. For instance, an inebriated user may need a significant amount of time to pass to ensure their sobriety prior to accessing a firearm.

Figure 7:
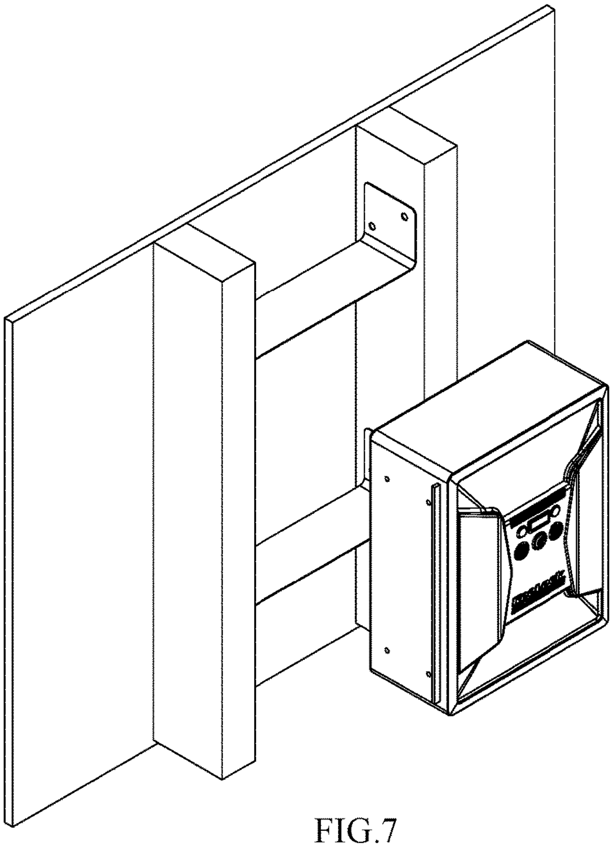
FIG. 7 is a perspective view of an embodiment of the present disclosure.
Figure 7A:
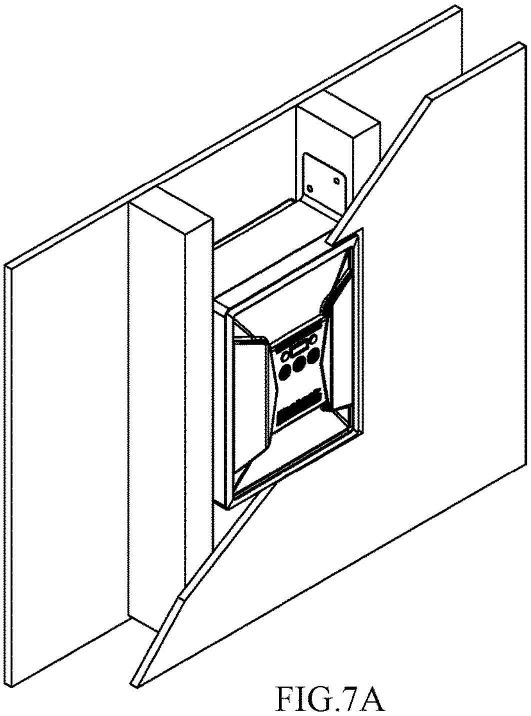
FIG. 7A is a perspective view of a wall-installed embodiment of the present disclosure.
Figure 7B:
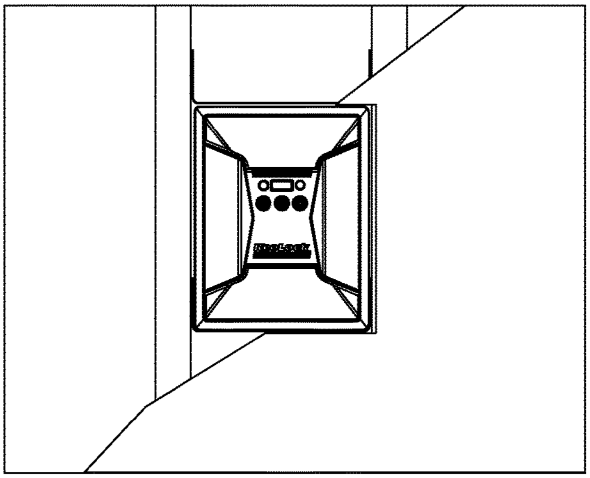
FIG. 7B is a front view of a wall-installed embodiment of the present disclosure

Regarding FIGS. 7, 7A, and 7B, these illustrations provide an example of an embodiment of a safe utilizing a multi-factor safe-locking system and how it may be installed between wall studs. Such a safe may be dimensioned to contain a firearm, for example, a handgun. Other embodiments may be larger to store rifles or shotguns. There is no limit to the size of a safe with a multi-factor safe-locking system.

Persons of ordinary skill in arts relevant to this disclosure and subject matter hereof will recognize those embodiments may comprise fewer features than illustrated in any individual embodiment described by example or otherwise contemplated herein. Embodiments described herein are not meant to be an exhaustive presentation of ways in which various features may be combined and/or arranged. Accordingly, the embodiments are not mutually exclusive combinations of features; rather, embodiments can comprise a combination of different individual features selected from different individual embodiments, as understood by persons of ordinary skill in the relevant arts. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is also intended to include features of a claim in any other independent claim, even if this claim is not directly made dependent on the independent claim.

I claim:

1. A multi-factor safe locking system for a safe comprising:

at least two keyed-locks, wherein each keyed-lock requires a unique key;

a first biometric reader and a second biometric reader, wherein the first and second biometric readers are structured and configured to respond to a biometric input from at least two users;

a code pad, wherein the code pad is structured and configured to respond to at least two unique codes; and a safe lock, wherein the safe lock is structured and configured to deactivate when, within a first predetermined time, the engaging of the at least two unique keys with the at least two keyed-locks, the first biometric reader responds to a first biometric input from the at least two users, the second biometric reader responds to a second biometric input from the at least two users, and an entry of the at least two unique codes into the code-pad.

2. The multi-factor safe locking system of claim 1, wherein the first biometric reader is a fingerprint scanner, or an iris scanner.

3. The multi-factor safe locking system of claim 1, wherein the first predetermined time comprises a range from ninety seconds to five minutes.

4. The multi-factor safe locking system of claim 1, wherein the second biometric reader comprises a blood-alcohol sensor, wherein the blood-alcohol sensor will respond to a predetermined amount of blood alcohol.

5. The multi-factor safe locking system of claim 4, wherein the at least one biometric reader is a fingerprint scanner, or an iris scanner.

6. The multi-factor safe locking system of claim 1, wherein the at least two keys are electronically-transmittable keys, or physical keys.

7. A method of using a multi-factor safe locking system comprising:

providing a multi-factor safe locking system for a safe comprising:

at least two keyed-locks, wherein each keyed-lock requires a unique key;

at least one biometric reader, wherein the at least one biometric reader is structured and configured to respond to a biometric input from at least two users;

a code pad, wherein the code pad is structured and configured to respond to at least two unique codes; and a safe lock, wherein the safe lock is structured and configured to deactivate within a first predetermined time;

applying a first key by a first user to a first keyed-lock;

engaging the first key with the first keyed-lock; wherein the engaging of the first key activates the at least one biometric reader;

inputting a first biometric from the first user into a first biometric reader, wherein the first biometric reader responds by activating the code pad;

inputting a first code into the code pad;

applying a second key by a second user to a second keyed-lock;

engaging the second key with the second keyed-lock, wherein the engaging of the second key activates the first biometric reader;

inputting a first biometric from the second user into the first biometric reader, wherein the first biometric reader responds by activating the code pad;

inputting a second code into the code pad before the end of the passing of the first predetermined time;

inputting a second biometric of the first user into a second biometric reader;

inputting a second biometric of the second user into the second biometric reader; and deactivating the safe lock.

8. The method of claim 7, wherein the first biometric reader is a fingerprint scanner, or an iris scanner.

9. The method of claim 7, wherein the first predetermined time comprises a range from ninety seconds to five minutes.

10. The method of claim 7 wherein the second biometric reader is a blood-alcohol sensor.

11. The method of claim 7, wherein the at least two keys are electronically-transmittable keys, or physical keys.

12. A method of using a multi-factor safe locking system comprising:

providing a multi-factor safe locking system for a safe comprising:

a first keyed-lock, wherein the first keyed-lock requires a unique key;

a first biometric reader, wherein the first biometric reader is structured and configured to respond to a first biometric input from a first user;

a second biometric reader, wherein the second biometric reader is a blood-alcohol sensor that is structured and configured to respond to a second biometric input from the first user;

a code pad;

a safe lock; and applying the unique key by the first user to the first keyed-lock;

engaging the first key with the first keyed-lock, wherein the engaging of the first key activates the first biometric reader;

inputting the first biometric from the first user into the first biometric reader, wherein the first biometric reader responds by activating the code pad;

inputting a first code into the code pad, wherein the code pad activates the second biometric reader;

inputting the second biometric from the first user into the second biometric reader; and deactivating the safe lock.

13. The method of claim 12, wherein the safe lock is structured and configured to deactivate within a first predetermined time, wherein the first predetermined time may comprise a range from ninety seconds to five minutes.

14. The method of claim 12, wherein the first biometric reader is a fingerprint scanner, or an iris scanner.

15. The method of claim 12, wherein the unique key is an electronically-transmittable key, or a physical key.

* * * * *